(12) United States Patent
Sanchez et al.

(10) Patent No.: US 11,504,622 B1
(45) Date of Patent: Nov. 22, 2022

(54) SYSTEMS AND METHODS FOR GENERATING VIRTUAL ENCOUNTERS IN VIRTUAL GAMES

(71) Applicant: BlueOwl, LLC, San Francisco, CA (US)

(72) Inventors: Kenneth Jason Sanchez, San Francisco, CA (US); Micah Wind Russo, Oakland, CA (US)

(73) Assignee: BlueOwl, LLC, San Francisco, CA (US)

( * ) Notice: Subject to any disclaimer, the term of this patent is extended or adjusted under 35 U.S.C. 154(b) by 0 days.

(21) Appl. No.: 17/404,152

(22) Filed: Aug. 17, 2021

(51) Int. Cl.
*A63F 13/65* (2014.01)
*G06T 11/00* (2006.01)
(Continued)

(52) U.S. Cl.
CPC ............ *A63F 13/65* (2014.09); *A63F 13/216* (2014.09); *A63F 13/217* (2014.09); *G06T 11/00* (2013.01);
(Continued)

(58) Field of Classification Search
CPC ...... A63F 13/65; A63F 13/216; A63F 13/217; A63F 2300/69; A63F 2300/8017; A63F 2300/807; G06T 11/00; G07C 5/02
See application file for complete search history.

(56) References Cited

U.S. PATENT DOCUMENTS

| | | | |
|---|---|---|---|
| 8,645,029 B2 * | 2/2014 | Kim | B60R 16/037 382/118 |
| 8,799,035 B2 * | 8/2014 | Coleman | G06Q 40/08 705/4 |

(Continued)

FOREIGN PATENT DOCUMENTS

| | | |
|---|---|---|
| CN | 105718065 A | 6/2016 |
| CN | 107543554 A | 1/2018 |

(Continued)

OTHER PUBLICATIONS

Ali et al., "Virtual Environment for Automobile Driving Test", In 2018 International Conference on Computing Sciences and Engineering (ICCSE), Mar. 2018, pp. 1-6.
(Continued)

*Primary Examiner* — David L Lewis
*Assistant Examiner* — Matthew D Hoel
(74) *Attorney, Agent, or Firm* — Faegre Drinker Biddle & Reath LLP

(57) ABSTRACT

Method and system for generating virtual encounters. For example, the method includes determining first real-world driving characteristics based upon first real-world telematics data of a first real-world user, generating a first virtual map based upon first real-world geolocation data, presenting the first virtual map in a virtual game, generating first virtual encounters based upon the first real-world driving characteristics and first real-world environmental data, applying the first virtual encounters to the first virtual map for a first virtual character to experience, determining second real-world driving characteristics based upon second real-world telematics data of a second real-world user, generating a second virtual map based upon second real-world geolocation data, presenting the second virtual map in the virtual game, generating second virtual encounters based upon the second real-world driving characteristics and second real-world environmental data, and applying the second virtual encounters to the second virtual map for a second virtual character to experience.

21 Claims, 5 Drawing Sheets

(51) Int. Cl.
*G07C 5/02* (2006.01)
*A63F 13/216* (2014.01)
*A63F 13/217* (2014.01)

(52) U.S. Cl.
CPC ..... *A63F 2300/69* (2013.01); *A63F 2300/807* (2013.01); *A63F 2300/8017* (2013.01); *G07C 5/02* (2013.01)

(56) References Cited

U.S. PATENT DOCUMENTS

| | | | | |
|---|---|---|---|---|
| 9,140,567 B2* | 9/2015 | Fryer | | G01C 21/3407 |
| 9,327,189 B2* | 5/2016 | Bavitz | | A63F 13/65 |
| 9,352,216 B2* | 5/2016 | Mullen | | A63F 13/327 |
| 9,373,203 B1* | 6/2016 | Fields | | B60W 40/09 |
| 9,381,426 B1* | 7/2016 | Hughes | | H04L 67/06 |
| 9,473,893 B2* | 10/2016 | Kuramura | | H04W 4/02 |
| 9,478,150 B1* | 10/2016 | Fields | | G01C 21/3676 |
| 9,586,591 B1* | 3/2017 | Fields | | B60K 35/00 |
| 9,643,089 B2* | 5/2017 | Ishikawa | | A63F 13/65 |
| 9,691,298 B1* | 6/2017 | Hsu-Hoffman | | G09B 19/167 |
| 9,754,425 B1* | 9/2017 | Iqbal | | B60W 40/09 |
| 9,786,170 B2* | 10/2017 | Roy | | G08G 1/096775 |
| 9,858,832 B1* | 1/2018 | Hsu-Hoffman | | G09B 19/167 |
| 9,892,573 B1* | 2/2018 | Hsu-Hoffman | | G07C 5/008 |
| 10,013,883 B2* | 7/2018 | Farnham, IV | | G06F 3/04842 |
| 10,055,794 B1* | 8/2018 | Konrardy | | G08G 1/147 |
| 10,086,287 B2* | 10/2018 | Krietzman | | A63F 13/216 |
| 10,127,570 B1* | 11/2018 | Cote | | G07C 5/0808 |
| 10,181,238 B2* | 1/2019 | Hate | | A63F 13/65 |
| 10,262,375 B1* | 4/2019 | Howard | | A63F 13/61 |
| 10,282,786 B1* | 5/2019 | Osborne | | A63F 13/822 |
| 10,360,576 B1* | 7/2019 | Hsu-Hoffman | | G06Q 30/0207 |
| 10,384,130 B2* | 8/2019 | Parisi | | A63F 13/216 |
| 10,403,043 B2* | 9/2019 | Kaufman | | G06T 19/006 |
| 10,430,745 B2* | 10/2019 | Rani | | G07C 5/008 |
| 10,445,758 B1* | 10/2019 | Bryer | | G06Q 40/08 |
| 10,521,983 B1* | 12/2019 | Hsu-Hoffman | | G06Q 40/08 |
| 10,557,715 B2* | 2/2020 | Caldas | | G01C 21/3484 |
| 10,617,938 B2* | 4/2020 | Chen | | A63F 3/0421 |
| 10,681,181 B2* | 6/2020 | Hamill | | G06Q 30/0209 |
| 10,703,378 B1* | 7/2020 | Russo | | G06F 16/248 |
| 10,713,543 B1* | 7/2020 | Skuin | | G06N 3/0454 |
| 10,723,312 B1* | 7/2020 | Potter | | B60W 40/08 |
| 10,737,184 B2* | 8/2020 | Baszucki | | A63F 13/795 |
| 10,775,179 B1* | 9/2020 | Hayward | | B60W 50/14 |
| 10,782,699 B2* | 9/2020 | Tao | | G05D 1/0214 |
| 10,788,332 B2* | 9/2020 | DeLuca | | G10L 13/04 |
| 10,831,207 B1* | 11/2020 | Leung | | G05D 1/0088 |
| 10,885,539 B1* | 1/2021 | Purgatorio | | B60W 40/09 |
| 10,915,964 B1* | 2/2021 | Purgatorio | | G06Q 30/0226 |
| 11,037,382 B2* | 6/2021 | Lei | | G05D 1/0088 |
| 2001/0006908 A1* | 7/2001 | Fujioka | | G09G 5/377 463/3 |
| 2002/0028704 A1* | 3/2002 | Bloomfield | | A63F 13/211 707/E17.11 |
| 2002/0070916 A1* | 6/2002 | Noro | | A63F 13/10 345/156 |
| 2002/0075286 A1* | 6/2002 | Yonezawa | | H04N 13/156 348/E13.059 |
| 2002/0082068 A1* | 6/2002 | Singhal | | A63F 13/5375 463/9 |
| 2002/0082082 A1* | 6/2002 | Stamper | | A63F 13/655 463/32 |
| 2002/0090985 A1* | 7/2002 | Tochner | | A63F 13/655 463/9 |
| 2002/0178033 A1* | 11/2002 | Yoshioka | | G06Q 40/08 705/4 |
| 2002/0198055 A1* | 12/2002 | Bull | | A63F 13/34 463/52 |
| 2003/0062675 A1* | 4/2003 | Noro | | G06F 3/011 273/237 |
| 2003/0144047 A1* | 7/2003 | Sprogis | | G01S 5/0072 463/9 |
| 2003/0224855 A1* | 12/2003 | Cunningham | | A63F 13/332 463/41 |
| 2004/0005927 A1* | 1/2004 | Bonilla | | A63H 30/04 463/60 |
| 2004/0046655 A1* | 3/2004 | Benes | | A63F 13/12 340/539.1 |
| 2004/0058732 A1* | 3/2004 | Piccionelli | | A63F 13/12 463/42 |
| 2004/0248653 A1* | 12/2004 | Barros | | A63F 13/60 463/43 |
| 2004/0259059 A1* | 12/2004 | Aoki | | A63F 13/5375 463/6 |
| 2005/0009608 A1* | 1/2005 | Robarts | | A63F 13/216 463/42 |
| 2005/0049022 A1* | 3/2005 | Mullen | | A63F 13/12 463/1 |
| 2006/0105838 A1* | 5/2006 | Mullen | | A63F 13/211 463/31 |
| 2006/0154710 A1* | 7/2006 | Serafat | | A63F 13/48 463/29 |
| 2006/0258420 A1* | 11/2006 | Mullen | | A63F 13/216 463/4 |
| 2007/0257804 A1* | 11/2007 | Gunderson | | G07C 5/0891 340/576 |
| 2007/0281765 A1* | 12/2007 | Mullen | | A63F 13/42 463/1 |
| 2007/0281766 A1* | 12/2007 | Mullen | | A63F 13/42 463/7 |
| 2008/0015018 A1* | 1/2008 | Mullen | | A63F 13/65 463/36 |
| 2008/0015024 A1* | 1/2008 | Mullen | | A63F 13/79 463/42 |
| 2008/0081694 A1* | 4/2008 | Hong | | A63H 3/36 463/34 |
| 2008/0280684 A1* | 11/2008 | McBride | | A63F 13/12 463/42 |
| 2008/0309675 A1* | 12/2008 | Fleury | | G06T 17/00 345/581 |
| 2010/0205012 A1* | 8/2010 | McClellan | | G07C 5/008 705/4 |
| 2011/0090075 A1* | 4/2011 | Armitage | | G07C 5/0816 340/439 |
| 2011/0212766 A1* | 9/2011 | Bowers | | G07F 17/32 463/25 |
| 2012/0052953 A1* | 3/2012 | Annambhotla | | A63F 13/216 463/40 |
| 2012/0072241 A1* | 3/2012 | Krause | | G06Q 40/02 705/4 |
| 2012/0185282 A1* | 7/2012 | Gore | | G06Q 30/02 705/1.1 |
| 2013/0090821 A1* | 4/2013 | Abboud | | G07C 5/085 701/123 |
| 2013/0164715 A1* | 6/2013 | Hunt | | G09B 9/052 434/65 |
| 2013/0268156 A1* | 10/2013 | Schumann | | G07C 5/085 701/31.4 |
| 2013/0311250 A1* | 11/2013 | Hickethier | | G06Q 30/0207 705/14.1 |
| 2014/0125678 A1* | 5/2014 | Wang | | A63F 13/80 345/473 |
| 2014/0195106 A1* | 7/2014 | McQuade | | G09B 5/125 701/33.9 |
| 2014/0195272 A1* | 7/2014 | Sadiq | | G06Q 40/08 705/4 |
| 2014/0322674 A1* | 10/2014 | Livneh | | G09B 9/40 434/30 |
| 2014/0322676 A1* | 10/2014 | Raman | | G09B 19/167 434/65 |
| 2014/0364238 A1* | 12/2014 | Koh | | A63F 13/00 463/42 |
| 2015/0081404 A1* | 3/2015 | Basir | | G06Q 30/08 705/14.1 |
| 2015/0093722 A1* | 4/2015 | Fitzgerald | | G09B 9/04 434/62 |
| 2015/0112504 A1* | 4/2015 | Binion | | G07C 5/008 701/1 |

(56) References Cited

U.S. PATENT DOCUMENTS

| | | | |
|---|---|---|---|
| 2015/0178998 A1* | 6/2015 | Attard | G07C 5/008 |
| | | | 701/23 |
| 2015/0187224 A1* | 7/2015 | Moncrief | G09B 9/052 |
| | | | 434/30 |
| 2015/0212722 A1 | 7/2015 | Leung et al. | |
| 2015/0294422 A1* | 10/2015 | Carver | G06Q 40/08 |
| | | | 705/4 |
| 2015/0310758 A1* | 10/2015 | Daddona | G09B 9/02 |
| | | | 434/30 |
| 2016/0003636 A1* | 1/2016 | Ng-Thow-Hing | G06V 20/588 |
| | | | 701/418 |
| 2016/0003836 A1* | 1/2016 | Stauber | H01J 49/40 |
| | | | 530/367 |
| 2016/0084661 A1* | 3/2016 | Gautama | G01C 21/365 |
| | | | 701/400 |
| 2016/0219024 A1* | 7/2016 | Verzun | H04L 63/102 |
| 2016/0371553 A1* | 12/2016 | Farnham, IV | G08G 1/04 |
| 2017/0061733 A1* | 3/2017 | Gulla | G07F 17/3241 |
| 2017/0089710 A1* | 3/2017 | Slusar | G01C 21/3807 |
| 2017/0323244 A1* | 11/2017 | Rani | G07C 5/02 |
| 2018/0247558 A1* | 8/2018 | Livneh | G09B 9/24 |
| 2018/0286268 A1* | 10/2018 | Ni | G02B 27/017 |
| 2018/0350144 A1* | 12/2018 | Rathod | H04W 4/021 |
| 2019/0096134 A1* | 3/2019 | Amacker | G06F 3/04815 |
| 2019/0108768 A1* | 4/2019 | Mohamed | G09B 19/14 |
| 2019/0113927 A1* | 4/2019 | Englard | G05D 1/0221 |
| 2019/0265703 A1* | 8/2019 | Hicok | G05D 1/0242 |
| 2019/0384292 A1* | 12/2019 | Aragon | B60W 40/09 |
| 2020/0013306 A1* | 1/2020 | McQuade | G09B 19/14 |
| 2020/0050719 A1* | 2/2020 | Fuerstenberg | G05D 1/0088 |
| 2020/0074266 A1* | 3/2020 | Peake | G06T 7/50 |
| 2020/0104326 A1* | 4/2020 | Ricci | G05D 1/0276 |
| 2020/0139250 A1* | 5/2020 | Curtis | A63F 13/70 |
| 2020/0286253 A1* | 9/2020 | Chilcote-Bacco | G06T 19/006 |
| 2020/0334762 A1* | 10/2020 | Carver | G06Q 40/08 |
| 2020/0357075 A1* | 11/2020 | Dahl | G06F 16/27 |
| 2021/0049925 A1* | 2/2021 | Robinson | G09B 9/44 |
| 2021/0232632 A1* | 7/2021 | Howard | G06F 16/335 |

FOREIGN PATENT DOCUMENTS

| | | |
|---|---|---|
| CN | 108253982 A | 7/2018 |
| CN | 108334090 A | 7/2018 |
| CN | 108446027 A | 8/2018 |
| CN | 109491394 A | 3/2019 |
| CN | 110427682 A | 11/2019 |
| CN | 210021183 U | 2/2020 |
| DE | 102013213179 A1 | 1/2015 |
| DE | 102018122864 A1 | 3/2020 |
| DE | 102019205083 A1 | 10/2020 |
| JP | 2014-181927 A | 9/2014 |
| KR | 10-2013-0107481 A | 10/2013 |
| WO | 2016/148753 A1 | 9/2016 |
| WO | 2019/245578 A1 | 12/2019 |
| WO | 2020/172634 A1 | 8/2020 |
| WO | 2020/181001 A1 | 9/2020 |

OTHER PUBLICATIONS

Avouris et al., "A review of mobile location-based games for learning across physical and virtual spaces", J. UCS, vol. 18, No. 15, 2012, pp. 2120-2142.

Bozorgi et al., "A Time and Energy Efficient Routing Algorithm for Electric Vehicles Based on Historical Driving Data", IEEE Transactions on Intelligent Vehicles, vol. 2, No. 4, 2017, pp.

Bui et al., "The Effects of Gamification on Driver Behavior: An Example from a Free Float Carsharing Service", 2015.

Culík et al., "Creating a Virtual Environment for Practical Driving Tests", In International Conference on Transport Systems Telematics, 2019, pp. 95-108.

Dooren et al., "Rewards That Make You Play: the Distinct Effect of Monetary Rewards, Virtual Points and Social Rewards on Play Persistence in Substance Dependent and Non-Dependent Adolescents", In 2018 IEEE 6th International Conference on Serious Games and Applications for Health (SeGAH), May 2018, pp. pp. 1-7.

Esser et al., "Towards learning a realistic rendering of human behavior", In Proceedings of the European Conference on Computer Vision (ECCV), 2018, (pp. 0-0).

Handel et al., "Insurance telematics: Opportunities and challenges with the smartphone solution", IEEE Intelligent Transportation Systems Magazine, vol. 6, No. 4, 2014, pp. 57-70.

Helvaci et al., "Improving Driver Behavior Using Gamication", In International Conference on Mobile Web and Intelligent Information Systems, Aug. 2018, pp. 193-204.

Herrtwich et al., "Cooperative Driving: Taking Telematics to the Next Level", In Traffic and Granular Flow'01, 2003, pp. 271-280.

International Search Report and Written Opinion received for PCT Patent Application No. PCT/US2021/013911, dated Mar. 31, 2021, 9 pages.

International Search Report and Written Opinion received for PCT Patent Application No. PCT/US2021/013918, dated Apr. 8, 2021, 10 pages.

International Search Report and Written Opinion received for PCT Patent Application No. PCT/US2021/013928, dated Apr. 2, 2021, 8 pages.

International Search Report and Written Opinion received for PCT Patent Application No. PCT/US2021/013930, dated Apr. 23, 2021, 12 pages.

Lang et al., "Synthesizing Personalized Training Programs for Improving Driving Habits via Virtual Reality", In 2018 IEEE Conference on Virtual Reality and 3D User Interfaces, Mar. 2018, pp. 297-304.

Liu et al., "Two Techniques for Assessing Virtual Agent Personality", IEEE Transactions on Affective Computing, vol. 7, No. 1, May 19, 2015, pp. 94-105.

Lopez et al., "Using pervasive games as learning tools in educational contexts: a systematic review", International Journal of Learning Technology, vol. 13, No. 2, 2018, pp. 93-114.

Richter et al., "Studying Gamification: The Effect of Rewards and Incentives on Motivation", In Gamification in education and business, 2015, pp. 21-46.

Sha et al., "Social vehicle navigation: integrating shared driving experience into vehicle navigation", In Proceedings of the 14th workshop on mobile computing systems and applications, Feb. 2013, pp. 1-6.

Singh et al., "Real-time Collaboration Between Mixed Reality Users in Geo-referenced Virtual Environment", arXiv preprint arXiv, 2020, 2010.01023.

Stojaspal, Jan., "Gamification and telematics", available online at https://www.tu-auto.com/gamification-and-telematics/, 2013, 6 pages.

wiki.sc4devotion.com, SimCity4 Encyclopaedia, "Tutorial: Understanding the Traffic Simulator", pp. 1-15. Retrieved from the Internet on Aug. 14, 2019: https://www.wiki.sc4devotion.com/index.php?title=Understanding_theTraffic_Simulator.

Wilken et al., "Maps and the Autonomous Vehicle as a Communication Platform", International Journal of Communication, vol. 13, 20'19, pp. 2703-2727.

Vibhor Rastogi (Virtual Reality Based Simulation Testbed for Evaluation of Autonomous Vehicle Behavior Algorithms, Clemson University, 2017, pp. 1-69) (Year: 2017).

"Drive Safe, Score Well: App Is A Driving 'Report Card'," by Lynn Jolicoeur and Sacha Pfeiffer, published Oct. 9, 2014. Source: https://www.wbur.org/news/2014/10/09/safe-driving-app (Year: 2014).

"UK Telematics Online. Submitted articles relating to Vehicle Telematics," published Aug. 31, 2009. Source https://web.archive.org/web/20090831075032/http://www.uktelematicsonline.co.uk/html/telematics_articles.html (Year: 2009).

* cited by examiner

SYSTEMS AND METHODS FOR GENERATING VIRTUAL ENCOUNTERS IN VIRTUAL GAMES

CROSS-REFERENCE TO RELATED APPLICATIONS

The following six applications, including this one, are being filed concurrently and the other five are hereby incorporated by reference in their entirety for all purposes:

1. U.S. patent application Ser. No. 17/404,139, titled "Systems and Methods for Generating Virtual Characters for a Virtual Game";
2. U.S. patent application Ser. No. 17/404,144, titled "Systems and Methods for Generating Virtual Experiences for a Virtual Game";
3. U.S. patent application Ser. No. 17/404,152, titled "Systems and Methods for Generating Virtual Encounters in Virtual Games";
4. U.S. patent application Ser. No. 17/404,158, titled "Systems and Methods for Generating Virtual Maps in Virtual Games";
5. U.S. patent application Ser. No. 17/404,164, titled "Systems and Methods for Generating Shared Virtual Maps in Virtual Games"; and
6. U.S. patent application Ser. No. 17/404,172, titled "Systems and Methods for Presenting Shared In-Game Objectives in Virtual Games".

FIELD OF THE DISCLOSURE

Some embodiments of the present disclosure are directed to generating virtual encounters in a virtual game. More particularly, certain embodiments of the present disclosure provide methods and systems for generating the virtual encounters using real-world telematics data and real-world environmental data. Merely by way of example, the present disclosure has been applied to presenting the virtual encounters for virtual characters in the virtual game to experience. But it would be recognized that the present disclosure has much broader range of applicability.

BACKGROUND OF THE DISCLOSURE

While individuals generally exercise care while operating vehicles, it is still challenging for many vehicle operators to fully appreciate the risks associated with vehicle operations. As such, many vehicle operators may not be readily mindful of reducing such risks. Hence, it is highly desirable to develop new technologies that can increase a vehicle operator's appreciation and awareness of the risks posed by vehicle operation.

BRIEF SUMMARY OF THE DISCLOSURE

Some embodiments of the present disclosure are directed to generating virtual encounters in a virtual game. More particularly, certain embodiments of the present disclosure provide methods and systems for generating the virtual encounters using real-world telematics data and real-world environmental data. Merely by way of example, the present disclosure has been applied to presenting the virtual encounters for virtual characters in the virtual game to experience. But it would be recognized that the present disclosure has much broader range of applicability.

According to certain embodiments, a method for generating one or more virtual encounters in one or more virtual games includes receiving first real-world telematics data, first real-world geolocation data, and first real-world environmental data associated with one or more prior first real-world vehicle trips made by a first real-world user. Also, the method includes determining one or more first real-world driving characteristics based at least in part upon the first real-world telematics data. Additionally, the method includes generating a first virtual map based at least in part upon the first real-world geolocation data, where the first virtual map is generated for a first virtual character associated with the first real-world user. The method then includes presenting the first virtual map and the first virtual character in a virtual game. Moreover, the method includes generating one or more first virtual encounters based at least in part upon the one or more first real-world driving characteristics and the first real-world environmental data, and applying the one or more first virtual encounters to the first virtual map for the first virtual character to experience. Further, the method includes receiving second real-world telematics data, second real-world geolocation data, and second real-world environmental data associated with one or more prior second real-world vehicle trips made by a second real-world user. Also, the method includes determining one or more second real-world driving characteristics based at least in part upon the second real-world telematics data. Additionally, the method includes generating a second virtual map based at least in part upon the second real-world geolocation data, where the second virtual map is generated for a second virtual character associated with the second real-world user. The method then includes presenting the second virtual map and the second virtual character in the virtual game. Moreover, the method includes generating one or more second virtual encounters based at least in part upon the one or more second real-world driving characteristics and the second real-world environmental data, and applying the one or more second virtual encounters to the second virtual map for the second virtual character to experience. The one or more first virtual encounters and the one or more second virtual encounters are generated to be different in response to the one or more first real-world driving characteristics, the one or more second real-world driving characteristics, the first real-world environmental data, and the second real-world environmental data.

According to some embodiments, a computing device for generating one or more virtual encounters for one or more virtual games includes one or more processors and a memory that stores instructions for execution by the one or more processors. The instructions, when executed, cause the one or more processors to receive first real-world telematics data, first real-world geolocation data, and first real-world environmental data associated with one or more prior first real-world vehicle trips made by a first real-world user. Also, the instructions, when executed, cause the one or more processors to determine one or more first real-world driving characteristics based at least in part upon the first real-world telematics data. Additionally, the instructions, when executed, cause the one or more processors to generate a first virtual map based at least in part upon the first real-world geolocation data, where the first virtual map is generated for a first virtual character associated with the first real-world user. The instructions, when executed, then cause the one or more processors to present the first virtual map and the first virtual character in a virtual game. Moreover, the instructions, when executed, cause the one or more processors to generate one or more first virtual encounters based at least in part upon the one or more first real-world driving characteristics and the first real-world environmental data, and apply the one or more first virtual encounters to the first virtual map for the first virtual character to experience. Further, the instructions, when executed, cause the one or more processors to receive second real-world telematics data, second real-world geolocation data, and second real-world environmental data associated with one or more prior second real-world vehicle trips made by a second real-world user. Also, the instructions, when executed, cause the one or more processors to determine one or more second real-world driving characteristics based at least in part upon the second real-world telematics data. Additionally, the instructions, when executed, cause the one or more processors to generate a second virtual map based at least in part upon the second real-world geolocation data, where the second virtual map is generated for a second virtual character associated with the second real-world user. The instructions, when executed, then cause the one or more processors to present the second virtual map and the second virtual character in the virtual game. Moreover, the instructions, when executed, cause the one or more processors to generate one or more second virtual encounters based at least in part upon the one or more second real-world driving characteristics and the second real-world environmental data, and apply the one or more second virtual encounters to the second virtual map for the second virtual character to experience. The one or more first virtual encounters and the one or more second virtual encounters are generated to be different in response to the one or more first real-world driving characteristics, the one or more second real-world driving characteristics, the first real-world environmental data, and the second real-world environmental data.

According to certain embodiments, a non-transitory computer-readable medium stores instructions for generating one or more virtual encounters for one or more virtual games. The instructions are executed by one or more processors of a computing device. The non-transitory computer-readable medium includes instructions to receive first real-world telematics data, first real-world geolocation data, and first real-world environmental data associated with one or more prior first real-world vehicle trips made by a first real-world user. Also, the non-transitory computer-readable medium includes instructions to determine one or more first real-world driving characteristics based at least in part upon the first real-world telematics data. Additionally, the non-transitory computer-readable medium includes instructions to generate a first virtual map based at least in part upon the first real-world geolocation data, where the first virtual map is generated for a first virtual character associated with the first real-world user. The non-transitory computer-readable medium then includes instructions to present the first virtual map and the first virtual character in a virtual game. Moreover, the non-transitory computer-readable medium includes instructions to generate one or more first virtual encounters based at least in part upon the one or more first real-world driving characteristics and the first real-world environmental data, and apply the one or more first virtual encounters to the first virtual map for the first virtual character to experience. Further, the non-transitory computer-readable medium includes instructions to receive second real-world telematics data, second real-world geolocation data, and second real-world environmental data associated with one or more prior second real-world vehicle trips made by a second real-world user. Also, the non-transitory computer-readable medium includes instructions to determine one or more second real-world driving characteristics based at least in part upon the second real-world telematics data. Additionally, the non-transitory computer-readable medium includes instructions to generate a second virtual map based at least in part upon the second real-world geolocation data, where the second virtual map is generated for a second virtual character associated with the second real-world user. The non-transitory computer-readable medium then includes instructions to present the second virtual map and the second virtual character in the virtual game. Moreover, the non-transitory computer-readable medium includes instructions to generate one or more second virtual encounters based at least in part upon the one or more second real-world driving characteristics and the second real-world environmental data, and apply the one or more second virtual encounters to the second virtual map for the second virtual character to experience. The one or more first virtual encounters and the one or more second virtual encounters are generated to be different in response to the one or more first real-world driving characteristics, the one or more second real-world driving characteristics, the first real-world environmental data, and the second real-world environmental data.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to generating virtual encounters in a virtual game. More particularly, certain embodiments of the present disclosure provide methods and systems for generating the virtual encounters using real-world telematics data and real-world environmental data. Merely by way of example, the present disclosure has been applied to presenting the virtual encounters for virtual characters in the virtual game to experience. But it would be recognized that the present disclosure has much broader range of applicability.

Figure 1A:
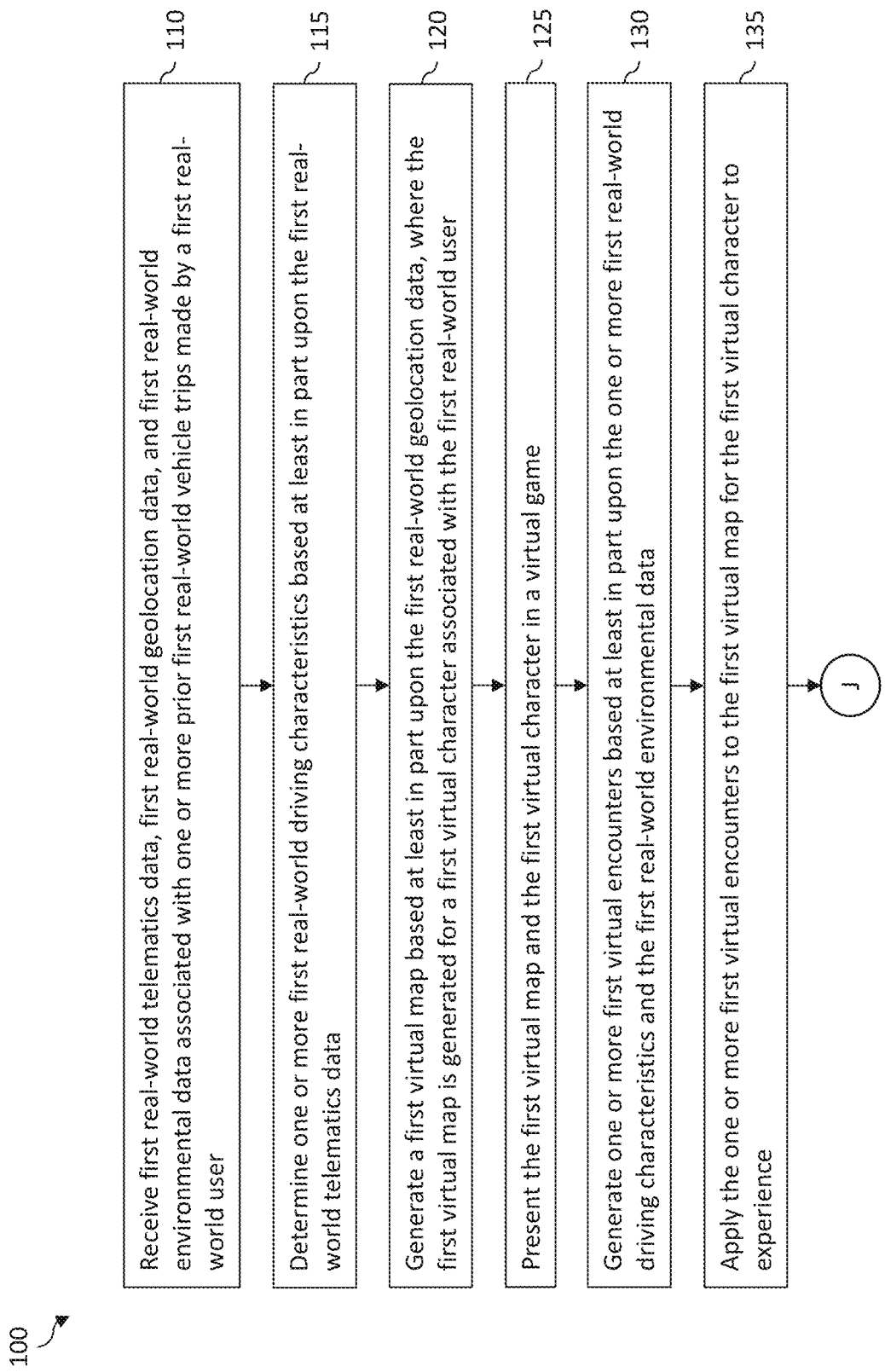
FIG. 1A and FIG. 1B show a simplified method for generating virtual encounters in virtual games according to certain embodiments of the present disclosure.
Figure 1B:
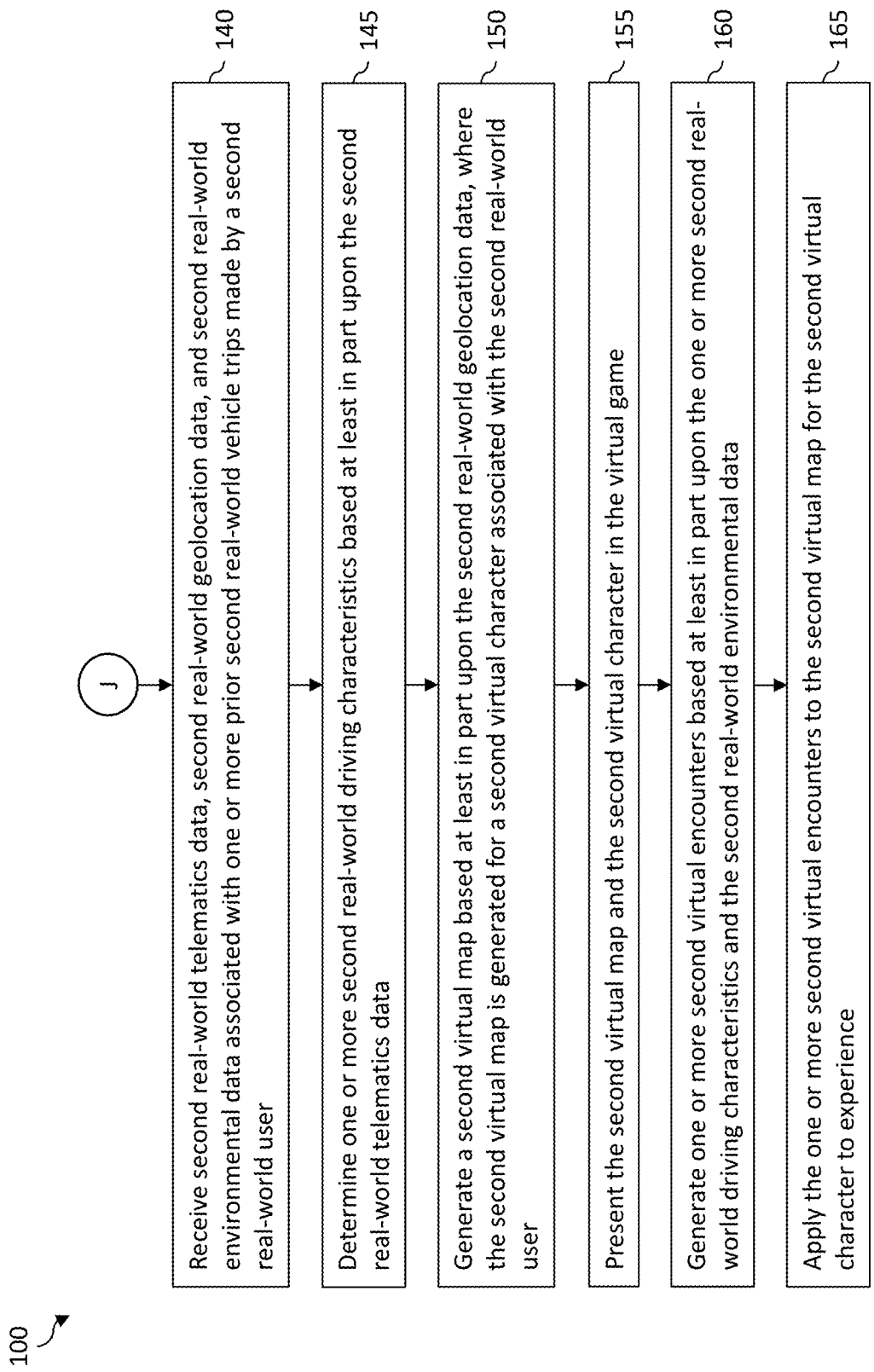

I. One or More Methods for Generating Virtual Encounters in Virtual Games According to Certain Embodiments FIG. 1A and FIG. 1B show a simplified method for generating virtual encounters in virtual games according to certain embodiments of the present disclosure. The figures are merely examples, which should not unduly limit the scope of the claims. One of ordinary skill in the art would recognize many variations, alternatives, and modifications. The method 100 includes process 110 for receiving first real-world data from a first real-world user, process 115 for determining first real-world driving characteristics, process

120 for generating a first virtual map for a first virtual character, process 125 for presenting the first virtual map and the first virtual character, process 130 for generating first virtual encounters, process 135 for applying the first virtual encounters, process 140 for receiving second real-world data from a second real-world user, process 145 for determining second real-world driving characteristics, process 150 for generating a second virtual map for a second virtual character, process 155 for presenting the second virtual map and the second virtual character, process 160 for generating second virtual encounters, and process 165 for applying the second virtual encounters. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 110, first real-world telematics data, first real-world geolocation data, and first real-world environmental data associated with one or more prior first real-world vehicle trips made by the first real-world user are received according to some embodiments. In various embodiments, the first real-world user is a real-world driver of a first real-world vehicle. In certain embodiments, the one or more prior first real-world vehicle trips correspond to actual vehicle trips that the first real-world user has made in the past. For example, the one or more prior first real-world vehicle trips include actual vehicle trips made by the first real-world user for any personal and/or business reasons (e.g., commuting to work, grocery shopping, going to a bank, road trips, etc.).

In some embodiments, the first real-world telematics data, the first real-world geolocation data, and/or the first real-world environmental data are collected from one or more sensors associated with the first real-world vehicle operated by the first real-world user. For example, the one or more sensors include any type and number of accelerometers, gyroscopes, magnetometers, barometers, location sensors (e.g., GPS sensors), tilt sensors, yaw rate sensors, brake sensors, airbag deployment sensors, windshield wiper sensors, headlight sensors, steering angle sensors, gear position sensors, proximity detectors, throttle sensors, gas tank sensors, battery sensors, ambient light sensors, rain sensors, etc. As an example, the first real-world telematics data include data collected by any type and number of accelerometers, gyroscopes, magnetometers, barometers, location sensors, tilt sensors, yaw rate sensors, speedometers, brake sensors, airbag sensors, windshield wiper sensors, headlight sensors, steering angle sensors, gear position sensors, proximity detectors, throttle sensors, gas tank sensors, battery sensors, ambient light sensors, rain sensors, etc. In certain embodiments, the one or more sensors are part of or located in the first real-world vehicle. For example, the one or more sensors communicate and store sensor data in an electronic control module (ECM) or an engine control unit (ECU) of the first real-world vehicle. In some embodiments, the one or more sensors are part of a computing device (e.g., a mobile device, a smart watch) that is connected to the first real-world vehicle. For example, the computing device is connected to the first real-world vehicle while the first real-world vehicle is in operation. As an example, the computing device is connected to the first real-world vehicle while the first real-world vehicle is stationary.

In certain embodiments, the first real-world telematics data indicate the operational state of the first real-world vehicle, such as speed, acceleration, braking event, etc. In some embodiments, the first real-world geolocation data indicate the physical locations of the first real-world vehicle. For example, the first real-world geolocation data include real-time GPS coordinates of the first real-world vehicle as the first real-world vehicle is in operation. As an example, the first real-world geolocation data include a first plurality of stopping points for the first real-world vehicle such as a starting location, an ending location, and one or more intermediate waypoint locations. In certain embodiments, the first real-world environmental data indicate the external environmental conditions of the first real-world vehicle, such as weather conditions (e.g., fog, snowstorm, flood, etc.), traffic conditions (e.g., traffic congestions, detours, vehicle accidents, etc.), and/or road conditions (e.g., road grade, road closures, road constructions, etc.).

At the process 115, one or more first real-world driving characteristics are determined based at least in part upon the first real-world telematics data according to certain embodiments. In various embodiments, the one or more first real-world driving characteristics indicate how the first real-world user drives, such as how frequently the first real-world user drives, type of maneuvers that the first real-world user makes while driving (e.g., hard cornering, hard braking, sudden acceleration, smooth acceleration, slowing before turning, etc.), types of dangerous driving events (e.g., eating while driving, falling asleep while driving, etc.), types of safe driving events (e.g., maintaining safe following distance, turning on headlights, observing traffic lights, yielding to pedestrians, etc.), etc.

In some embodiments, the one or more first real-world driving characteristics refer to one or more driving skills of the first real-world user. For example, the one or more first real-world driving characteristics include a first braking characteristic, a first steering characteristic, a first speeding characteristic, and/or a first focus characteristic. As an example, the first braking characteristic corresponds to the first real-world user's ability to decelerate the first real-world vehicle upon encountering braking obstacles (e.g., T-junctions, stop signs, pedestrian crossings, etc.). For example, the first steering characteristic corresponds to the first real-world user's ability to steer the first real-world vehicle upon encountering steering obstacles (e.g., potholes, road kills, sharp turns, etc.). As an example, the first speeding characteristic corresponds to the first real-world user's ability to decelerate the first real-world vehicle upon encountering speeding obstacles (e.g., approaching a school zone, entering city limit, etc.). For example, the first focus characteristic corresponds to the first real-world user's ability to maintain or regain focus while operating the first real-world vehicle upon encountering focus obstacles (e.g., using a cell phone while driving).

At the process 120, the first virtual map is generated based at least in part upon the first real-world geolocation data according to some embodiments. In various embodiments, the first virtual map is generated for the first virtual character associated with the first real-world user. In certain embodiments, the first virtual map is a digital representation of the physical locations and/or landmarks that the first real-world user has visited while operating the first real-world vehicle. For example, the first virtual map may show various virtual roads corresponding to real-world roads, virtual bridges corresponding to real-world bridges, virtual buildings corresponding to real-world buildings, virtual parks corresponding to real-world parks, etc.

At the process 125, the first virtual map and the first virtual character are presented in a virtual game according to certain embodiments. For example, the first virtual map and the first virtual character are presented in a remote display (e.g., in a mobile device of the first real-world user). In various embodiments, the virtual game simulates a virtual driving environment in which the first virtual character operates a first virtual vehicle. In certain embodiments, the first virtual character exists in the virtual game as a playable character for the first real-world user to control. For example, the first real-world user can direct the first virtual character to operate the first virtual vehicle in traversing the first virtual map.

At the process 130, one or more first virtual encounters are generated based at least in part upon the one or more first real-world driving characteristics and the first real-world environmental data according to some embodiments. In certain embodiments, generating the one or more first virtual encounters includes generating one or more first virtual experiences for the first virtual character based at least in part upon the one or more first real-world driving characteristics. In some embodiments, the one or more first virtual experiences include one or more first virtual obstacles to be placed at corresponding one or more first virtual locations in the first virtual map. For example, the one or more first virtual obstacles may include a first virtual crosswalk whose properties (e.g., shape, size, color, etc.) are based at least in part upon the first braking characteristic. As an example, the one or more first virtual obstacles may include a first virtual pothole whose properties are based at least in part upon the first steering characteristic. For example, the one or more first virtual obstacles may include a first virtual speed bump whose properties are based at least in part upon the first speeding characteristic. As an example, the one or more first virtual obstacles may include a first virtual billboard whose properties are based at least in part upon the first focus characteristic. For example, the first virtual crosswalk, the first virtual pothole, the first virtual speed bump, and/or the first virtual billboard may be placed at various virtual locations throughout the first virtual map.

In some embodiments, generating the one or more first virtual encounters includes generating one or more first virtual environmental conditions for the first virtual character based at least in part upon the one or more first real-world environmental data. In certain embodiments, the one or more first virtual environmental conditions include a first virtual weather condition, a first virtual traffic condition, and/or a first virtual road condition.

In certain embodiments, the one or more first real-world environmental data may indicate a weather condition such as a snowstorm. For example, the first virtual weather condition simulates a virtual snowstorm in the first virtual map. In some embodiments, the one or more first real-world environmental data may indicate a traffic condition such as a traffic jam. As an example, the first virtual traffic condition simulates a virtual traffic jam in the first virtual map. In certain embodiments, the one or more first real-world environmental data may indicate a road condition such as a road construction. For example, the first virtual road condition simulates a virtual road construction in the first virtual map. In various embodiments, the one or more first virtual environmental conditions are selected from a group consisting of the first virtual weather condition, the first virtual traffic condition, and the first virtual road condition.

At the process 135, the one or more first virtual encounters are applied to the first virtual map for the first virtual character to experience according to some embodiments. In various embodiments, applying the one or more first virtual encounters for the first virtual character to experience entails that the first virtual character operates the first virtual vehicle to navigate the one or more first virtual obstacles (e.g., the first virtual crosswalk, the first virtual pothole, the first virtual speed bump, the first virtual billboard) along a first virtual route in the first virtual map under any or all of the first virtual weather condition, the first virtual traffic condition, and the first virtual road condition.

In some embodiments, the first virtual weather condition simulates the virtual snowstorm. For example, the first virtual character may experience the effects of the virtual snowstorm such as reduced visibility when operating the first virtual vehicle during the virtual snowstorm. In certain embodiments, the first virtual traffic condition simulates the virtual traffic jam. As an example, the first virtual character may experience the effects of the virtual traffic jam such as increased vehicular queuing when operating the first virtual vehicle at the time of the virtual traffic jam. In some embodiments, the first virtual road condition simulates the virtual road construction. For example, the first virtual character may experience the effects of the virtual road construction such as reduced speed when operating the first virtual vehicle around the virtual road construction.

At the process 140, second real-world telematics data, second real-world geolocation data, and second real-world environmental data associated with one or more prior second real-world vehicle trips made by the second real-world user are received according to some embodiments. In various embodiments, the second real-world user is a real-world driver of a second real-world vehicle. In certain embodiments, the one or more prior second real-world vehicle trips correspond to actual vehicle trips that the second real-world user has made in the past. For example, the one or more prior second real-world vehicle trips include actual vehicle trips made by the second real-world user for any personal and/or business reasons.

In some embodiments, the second real-world telematics data, the second real-world geolocation data, and/or the second real-world environmental data are collected from one or more sensors associated with the second real-world vehicle operated by the second real-world user. For example, the one or more sensors include any type and number of accelerometers, gyroscopes, magnetometers, barometers, location sensors (e.g., GPS sensors), tilt sensors, yaw rate sensors, brake sensors, airbag deployment sensors, windshield wiper sensors, headlight sensors, steering angle sensors, gear position sensors, proximity detectors, throttle sensors, gas tank sensors, battery sensors, ambient light sensors, rain sensors, etc. As an example, the second real-world telematics data include data collected by any type and number of accelerometers, gyroscopes, magnetometers, barometers, location sensors, tilt sensors, yaw rate sensors, speedometers, brake sensors, airbag sensors, windshield wiper sensors, headlight sensors, steering angle sensors, gear position sensors, proximity detectors, throttle sensors, gas tank sensors, battery sensors, ambient light sensors, rain sensors, etc. In certain embodiments, the one or more sensors are part of or located in the second real-world vehicle. For example, the one or more sensors communicate and store sensor data in an ECM or ECU of the second real-world vehicle. In some embodiments, the one or more sensors are part of a computing device that is connected to the second real-world vehicle. For example, the computing device is connected to the second real-world vehicle while the second real-world vehicle is in operation. As an example, the computing device is connected to the second real-world vehicle while the second real-world vehicle is stationary.

In certain embodiments, the second real-world telematics data indicate the operational state of the second real-world vehicle. In some embodiments, the second real-world geolocation data indicate the physical locations of the second real-world vehicle. For example, the second real-world geolocation data include real-time GPS coordinates of the second real-world vehicle as the second real-world vehicle is in operation. As an example, the second real-world geolocation data include a second plurality of stopping points for the second real-world vehicle such as a starting location, an ending location, and one or more intermediate waypoint locations. In certain embodiments, the second real-world environmental data indicate the external environmental conditions of the second real-world vehicle, such as weather conditions, traffic conditions, and/or road conditions. In various embodiments, the second real-world environmental data (as well as the first real-world environment data) can be obtained from various databases that provide real-time information on weather, traffic, and/or road conditions.

At the process 145, one or more second real-world driving characteristics are determined based at least in part upon the second real-world telematics data according to certain embodiments. In various embodiments, the one or more second real-world driving characteristics indicate how the second real-world user drives, such as how frequently the second real-world user drives, type of maneuvers that the second real-world user makes while driving, types of dangerous driving events, types of safe driving events, etc.

In some embodiments, the one or more second real-world driving characteristics refer to one or more driving skills of the second real-world user. For example, the one or more second real-world driving characteristics include a second braking characteristic, a second steering characteristic, a second speeding characteristic, and/or a second focus characteristic. As an example, the second braking characteristic corresponds to the second real-world user's ability to decelerate the second real-world vehicle upon encountering braking obstacles. For example, the second steering characteristic corresponds to the second real-world user's ability to steer the second real-world vehicle upon encountering steering obstacles. As an example, the second speeding characteristic corresponds to the second real-world user's ability to decelerate the second real-world vehicle upon encountering speeding obstacles. For example, the second focus characteristic corresponds to the second real-world user's ability to maintain or regain focus while operating the second real-world vehicle upon encountering focus obstacles.

At the process 150, the second virtual map is generated based at least in part upon the second real-world geolocation data according to some embodiments. In various embodiments, the second virtual map is generated for the second virtual character associated with the second real-world user. In certain embodiments, the second virtual map is a digital representation of the physical locations and/or landmarks that the second real-world user has visited while operating the second real-world vehicle. For example, the second virtual map may show various virtual highways corresponding to real-world highways, virtual tunnels corresponding to real-world tunnels, virtual stadiums corresponding to real-world stadiums, virtual museums corresponding to real-world museums, etc.

In various embodiments, the first real-world geolocation data and the second real-world geolocation data are different. For example, the first virtual map and the second virtual map are generated to be different in response to the first real-world geolocation data and the second real-world geolocation data being different.

At the process 155, the second virtual map and the second virtual character are presented in the virtual game according to certain embodiments. For example, the second virtual map and the second virtual character are presented in a remote display (e.g., in a mobile device of the second real-world user). In various embodiments, the second virtual character operates a second virtual vehicle in the virtual game. In certain embodiments, the second virtual character exists in the virtual game as a playable character for the second real-world user to control. For example, the second real-world user can direct the second virtual character to operate the second virtual vehicle in traversing the second virtual map.

At the process 160, one or more second virtual encounters are generated based at least in part upon the one or more second real-world driving characteristics and the second real-world environmental data according to some embodiments. In certain embodiments, generating the one or more second virtual encounters includes generating one or more second virtual experiences for the second virtual character based at least in part upon the one or more second real-world driving characteristics. In some embodiments, the one or more second virtual experiences include one or more second virtual obstacles to be placed at corresponding one or more second virtual locations in the second virtual map. For example, the one or more second virtual obstacles may include a second virtual crosswalk whose properties are based at least in part upon the second braking characteristic. As an example, the one or more second virtual obstacles may include a second virtual pothole whose properties are based at least in part upon the second steering characteristic. For example, the one or more second virtual obstacles may include a second virtual speed bump whose properties are based at least in part upon the second speeding characteristic. As an example, the one or more second virtual obstacles may include a second virtual billboard whose properties are based at least in part upon the second focus characteristic. For example, the second virtual crosswalk, the second virtual pothole, the second virtual speed bump, and/or the second virtual billboard may be placed at various virtual locations throughout the second virtual map.

In some embodiments, generating the one or more second virtual encounters includes generating one or more second virtual environmental conditions for the second virtual character based at least in part upon the one or more second real-world environmental data. In certain embodiments, the one or more second virtual environmental conditions include a second virtual weather condition, a second virtual traffic condition, and/or a second virtual road condition.

In certain embodiments, the one or more second real-world environmental data may indicate a weather condition such as a flood. For example, the second virtual weather condition simulates a virtual flood in the second virtual map. In some embodiments, the one or more second real-world environmental data may indicate a traffic condition such as a vehicle accident. As an example, the second virtual traffic condition simulates a virtual vehicle accident in the second virtual map. In certain embodiments, the one or more second real-world environmental data may indicate a road condition such as a road closure. For example, the second virtual road condition simulates a virtual road closure in the second virtual map. In various embodiments, the one or more second virtual environmental conditions are selected from a group consisting of the second virtual weather condition, the second virtual traffic condition, and the second virtual road condition.

At the process 165, the one or more second virtual encounters are applied to the second virtual map for the second virtual character to experience according to some embodiments. In various embodiments, applying the one or more second virtual encounters for the second virtual character to experience entails that the second virtual character operates the second virtual vehicle to navigate the one or more second virtual obstacles (e.g., the second virtual crosswalk, the second virtual pothole, the second virtual speed bump, the second virtual billboard) along a second virtual route in the second virtual map under any or all of the second virtual weather condition, the second virtual traffic condition, and the second virtual road condition. According to various embodiments, the second virtual route in the second virtual map is different from the first virtual route in the first virtual map.

In some embodiments, the second virtual weather condition simulates the virtual flood. For example, the second virtual character may experience the effects of the virtual flood such as reduced maneuverability when operating the second virtual vehicle during the virtual flood. In certain embodiments, the second virtual traffic condition simulates the virtual vehicle accident. As an example, the second virtual character may experience the effects of the virtual vehicle accident such as reduced speed when operating the second virtual vehicle at the time of the virtual vehicle accident. In some embodiments, the second virtual road condition simulates the virtual road closure. For example, the second virtual character may experience the effects of the virtual road closure such as increased trip times when operating the second virtual vehicle around the virtual road closure.

According to various embodiments, the one or more first virtual encounters and the one or more second virtual encounters are generated to be different in response to differences or similarities in the one or more first real-world driving characteristics and the one or more second real-world driving characteristics, and/or differences or similarities in the first real-world environmental data and the second real-world environmental data.

In some embodiments, the one or more first real-world driving characteristics and the one or more second real-world driving characteristics are different, and the first real-world environmental data and the second real-world environmental data are the same. In certain embodiments, the one or more first virtual encounters and the one or more second virtual encounters are generated to be different in response to the one or more first real-world driving characteristics and the one or more second real-world driving characteristics being different and the first real-world environmental data and the second real-world environmental data being the same. For example, the first virtual character and the second virtual character may interact with different virtual obstacles at different virtual locations, but experience the same virtual weather condition, the same virtual traffic condition, and/or the same virtual road condition.

In some embodiments, the one or more first real-world driving characteristics and the one or more second real-world driving characteristics are the same, and the first real-world environmental data and the second real-world environmental data are different. In certain embodiments, the one or more first virtual encounters and the one or more second virtual encounters are generated to be different in response to the one or more first real-world driving characteristics and the one or more second real-world driving characteristics being the same and the first real-world environmental data and the second real-world environmental data being different. For example, the first virtual character and the second virtual character may interact with the same virtual obstacles at similar virtual locations, but experience different virtual weather conditions, different virtual traffic conditions, and/or different virtual road conditions.

In some embodiments, the one or more first real-world driving characteristics and the one or more second real-world driving characteristics are different, and the first real-world environmental data and the second real-world environmental data are different. In certain embodiments, the one or more first virtual encounters and the one or more second virtual encounters are generated to be different in response to the one or more first real-world driving characteristics and the one or more second real-world driving characteristics being different and the first real-world environmental data and the second real-world environmental data being different. For example, the first virtual character and the second virtual character may interact with different virtual obstacles at different virtual locations as well as experience different virtual weather conditions, different virtual traffic conditions, and/or different virtual road conditions.

In certain embodiments, the first virtual character experiencing the one or more first virtual encounters in the first virtual map is presented in the same virtual game as the second virtual character experiencing the one or more second virtual encounters in the second virtual map. In some embodiments, the first virtual character experiencing the one or more first virtual encounters in the first virtual map is presented in a different virtual game as the second virtual character experiencing the one or more second virtual encounters in the second virtual map. For example, the first virtual character experiencing the one or more first virtual encounters in the first virtual map is presented in a first virtual game played the first real-world user, while the second virtual character experiencing the one or more second virtual encounters in the second virtual map is presented in a second virtual game played by the second real-world user.

In certain embodiments, instead of the virtual driving environment, the virtual game simulates a virtual role-playing environment in which each of the first and second virtual characters accomplishes a quest. In some embodiments, instead of the virtual driving environment, the virtual game simulates a virtual battle environment in which each of the first and second virtual characters fights in a battle. In various embodiments, applying virtual encounters for the first and second virtual characters to experience includes allowing the first and second virtual characters to overcome virtual obstacles (e.g., virtual enemies, virtual monsters, virtual puzzles, etc.) in the virtual role-playing environment and/or the virtual battle environment.

In some embodiments, virtual environmental conditions are generated and applied to the virtual role-playing environment and/or the virtual battle environment. In certain examples, real-world environmental data may indicate a weather condition such as a fog. As an example, a virtual fog is simulated for the first and/or second virtual characters to experience. For example, the first and/or second virtual characters may experience the effects of the virtual fog such as reduced visibility when trying to overcome any of the virtual obstacles in the middle of the virtual fog. In some examples, real-world environmental data may indicate a traffic condition such as a traffic detour. As an example, a virtual winding path is simulated for the first and/or second virtual characters to experience. For example, the first and/or second virtual characters may experience the effects of the virtual winding path such as delays in traversing the virtual winding path when trying to find any of the virtual obstacles. In certain examples, real-world environmental data may indicate a road condition such as a steep road. As an example, a virtual hill is simulated for the first and/or second virtual characters to experience. For example, the first and/or second virtual characters may experience the effects of the virtual hill such as reduced speed when trying to climb the virtual hill in order to reach any of the virtual obstacles.

As discussed above and further emphasized here, FIG. 1A and FIG. 1B are merely examples, which should not unduly limit the scope of the claims. One of ordinary skill in the art would recognize many variations, alternatives, and modifications. In some examples, at the process 110, data from video or photographic capturing devices are also received. For example, the video or photographic capturing devices may be utilized to capture images internally or externally to the first real-world vehicle to determine the one or more first real-world driving characteristics and/or conditions surrounding the first real-world vehicle. In certain examples, at the process 140, data from video or photographic capturing devices are also received. For example, the video or photographic capturing devices may be utilized to capture images internally or externally to the second real-world vehicle to determine the one or more second real-world driving characteristics and/or conditions surrounding the second real-world vehicle.

Figure 2:
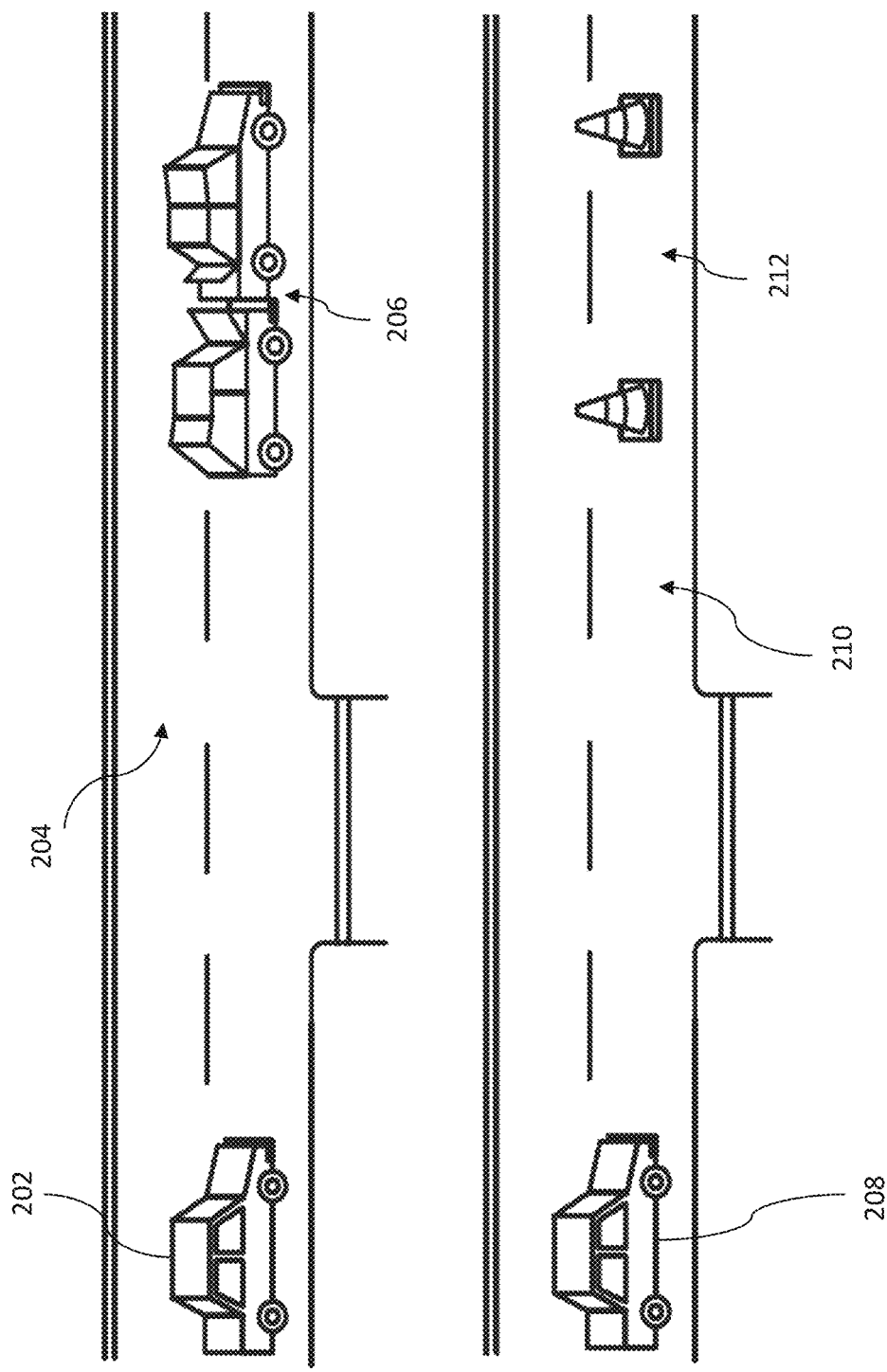
FIG. 2 shows a simplified diagram illustrating virtual encounters according to certain embodiments of the present disclosure.

FIG. 2 shows a simplified diagram illustrating one or more virtual encounters that are generated by the method 100 as shown in FIG. 1A and FIG. 1B according to some embodiments of the present disclosure. This figure is merely an example, which should not unduly limit the scope of the claims. One of ordinary skill in the art would recognize many variations, alternatives, and modifications.

In certain embodiments, the one or more first virtual encounters and the one or more second virtual encounters that have been generated by the method 100 are represented by virtual environmental conditions. In some embodiments where the virtual driving environment is simulated in the virtual game, the virtual environmental conditions, such as virtual traffic conditions and/or virtual road conditions, are applied for the virtual characters to experience while operating respective virtual vehicles. For example, a virtual vehicle 202 is traveling on a virtual route 204 and experiences a virtual vehicle accident 206 while on the virtual route 204. As an example, a virtual vehicle 208 is traveling on a virtual route 210 and experiences a virtual road closure 212 while on the virtual route 210.

Figure 3:
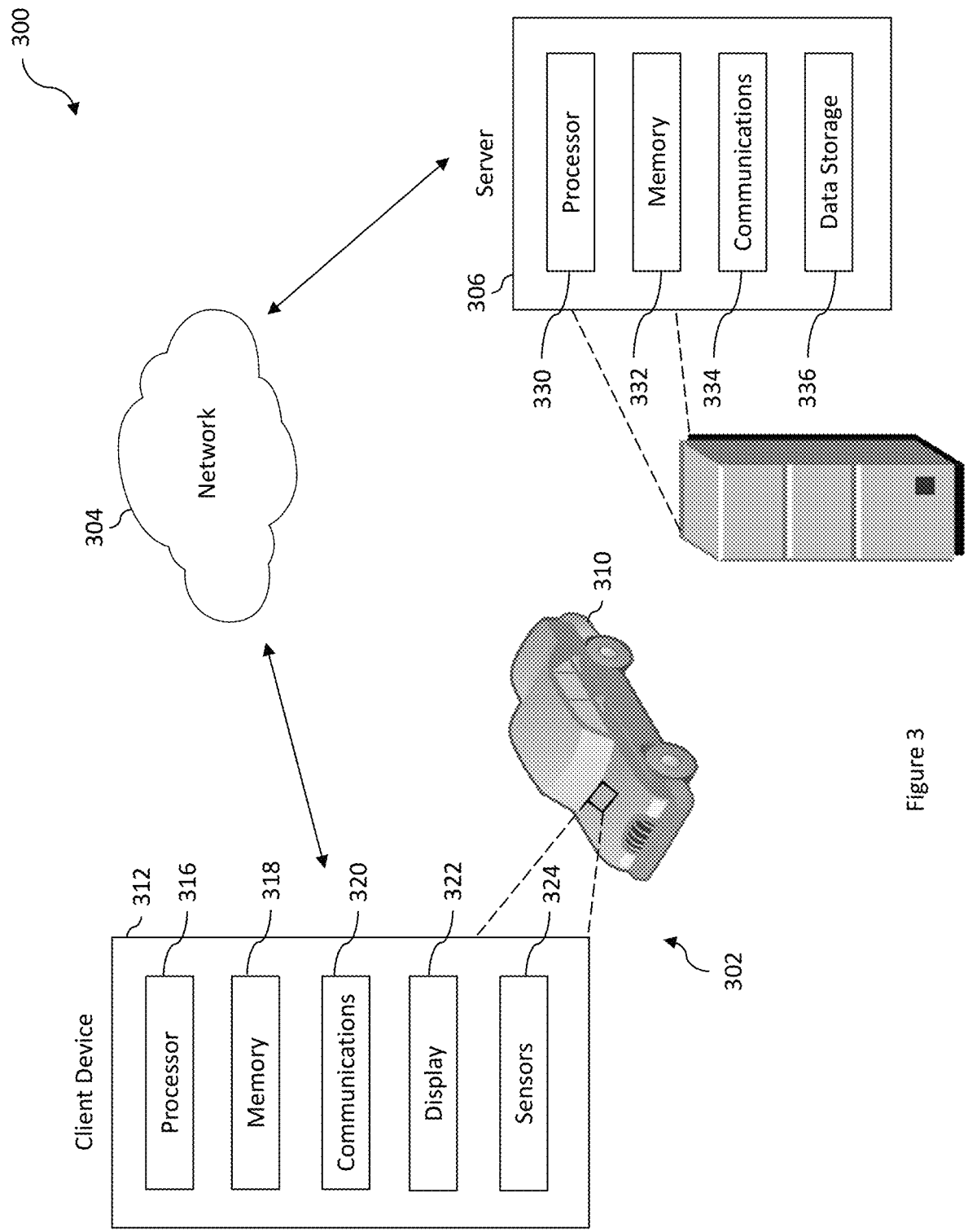
FIG. 3 shows a simplified system for generating virtual encounters in virtual games according to certain embodiments of the present disclosure.

II. One or More Systems for Generating Virtual Encounters in Virtual Games According to Certain Embodiments FIG. 3 shows a simplified system for generating virtual encounters in virtual games according to certain embodiments of the present disclosure. This figure is merely an example, which should not unduly limit the scope of the claims. One of ordinary skill in the art would recognize many variations, alternatives, and modifications. The system 300 includes a vehicle system 302, a network 304, and a server 306. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 300 is used to implement the method 100. According to certain embodiments, the vehicle system 302 includes a vehicle 310 and a client device 312 associated with the vehicle 310. For example, the client device 312 is an on-board computer embedded or located in the vehicle 310. As an example, the client device 312 is a mobile device (e.g., a smartphone) that is connected (e.g., via wired or wireless links) to the vehicle 310. As an example, the client device 312 includes a processor 316 (e.g., a central processing unit (CPU), a graphics processing unit (GPU)), a memory 318 (e.g., random-access memory (RAM), read-only memory (ROM), flash memory), a communications unit 320 (e.g., a network transceiver), a display unit 322 (e.g., a touchscreen), and one or more sensors 324 (e.g., an accelerometer, a gyroscope, a magnetometer, a barometer, a GPS sensor). In certain embodiments, the client device 312 represents the on-board computer in the vehicle 310 and the mobile device connected to the vehicle 310. For example, the one or more sensors 324 may be in the vehicle 310 and in the mobile device connected to the vehicle 310.

In some embodiments, the vehicle 310 is operated by a real-world user, such as the first real-world user and/or the second real-world user. In certain embodiments, multiple vehicles 310 exist in the system 300 which are operated by respective users. For example, the first real-world user operates the first real-world vehicle and the second real-world user operates the second real-world vehicle.

In various embodiments, during vehicle trips, the one or more sensors 324 monitor the vehicle 310 by collecting data associated with various operating parameters of the vehicle, such as speed, acceleration, braking, location, and other suitable parameters. In certain embodiments, the collected data include telematics data, geolocation data, and/or environmental data. According to some embodiments, the data are collected continuously, at predetermined time intervals, and/or based on a triggering event (e.g., when each sensor has acquired a threshold amount of sensor measurements). In various embodiments, the collected data represent the first real-world telematics data, the first real-world geolocation data, the first real-world environmental data, the second real-world telematics data, the second real-world geolocation data, and/or the second real-world environmental data in the method 100.

According to certain embodiments, the collected data are stored in the memory 318 before being transmitted to the server 306 using the communications unit 320 via the network 304 (e.g., via a local area network (LAN), a wide area network (WAN), the Internet). In some embodiments, the collected data are transmitted directly to the server 306 via the network 304. For example, the collected data are transmitted to the server 306 without being stored in the memory 318. In certain embodiments, the collected data are transmitted to the server 306 via a third party. For example, a data monitoring system stores any and all data collected by the one or more sensors 324 and transmits those data to the server 306 via the network 304 or a different network.

According to some embodiments, the server 306 includes a processor 330 (e.g., a microprocessor, a microcontroller), a memory 332, a communications unit 334 (e.g., a network transceiver), and a data storage 336 (e.g., one or more databases). In some embodiments, the server 306 is a single server, while in certain embodiments, the server 306 includes a plurality of servers with distributed processing. In FIG. 3, the data storage 336 is shown to be part of the server 306. In certain embodiments, the data storage 336 is a separate entity coupled to the server 306 via a network such as the network 304. In some embodiments, the server 306 includes various software applications stored in the memory 332 and executable by the processor 330. For example, these software applications include specific programs, routines, or scripts for performing functions associated with the method 100. As an example, the software applications include general-purpose software applications for data processing, network communication, database management, web server operation, and/or other functions typically performed by a server.

According to various embodiments, the server 306 receives, via the network 304, the data collected by the one or more sensors 324 using the communications unit 334 and stores the data in the data storage 336. For example, the server 306 then processes the data to perform one or more processes of the method 100.

According to certain embodiments, any related information determined or generated by the method 100 (e.g., real-world driving characteristics, virtual maps, virtual encounters, etc.) are transmitted back to the client device 312, via the network 304, to be provided (e.g., displayed) to the user via the display unit 322.

In some embodiments, one or more processes of the method 100 are performed by the client device 312. For example, the processor 316 of the client device 312 processes the data collected by the one or more sensors 324 to perform one or more processes of the method 100.

Figure 4:
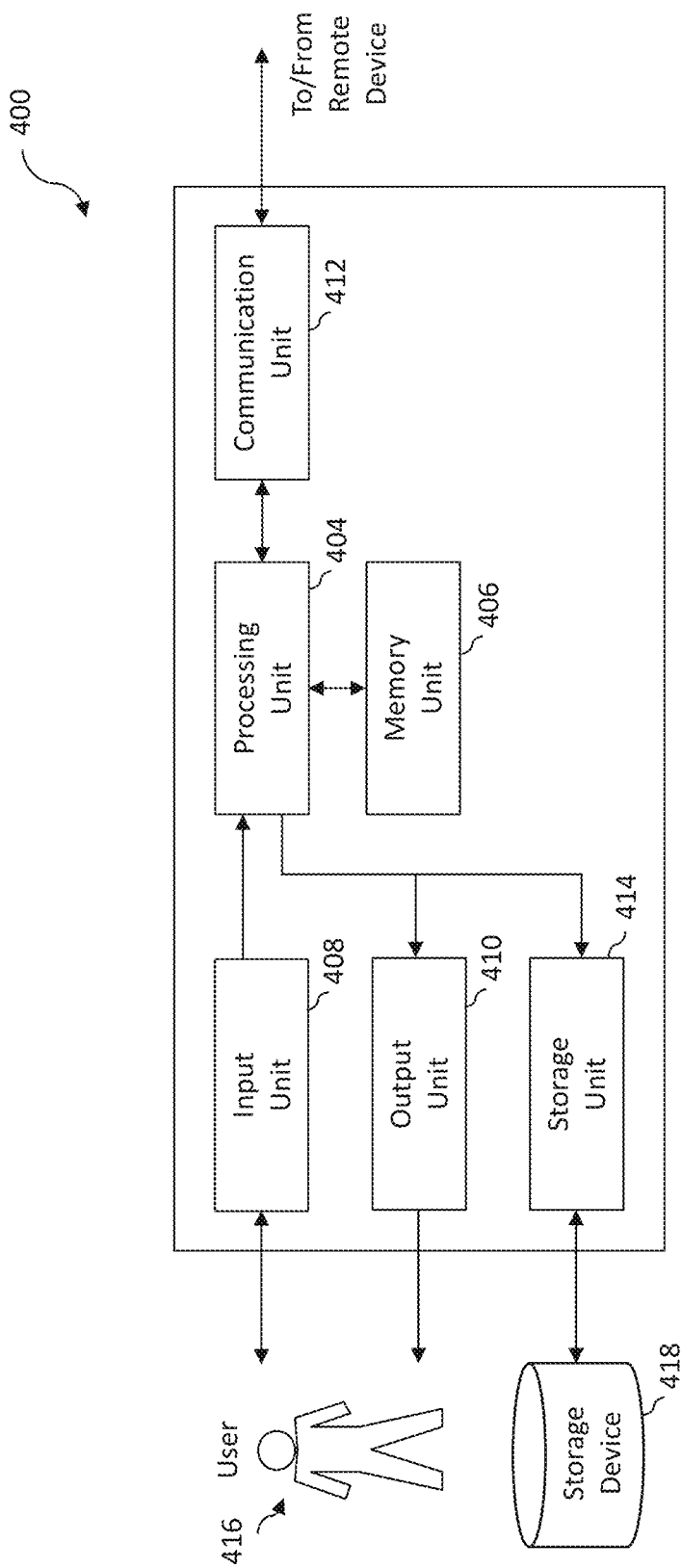
FIG. 4 shows a simplified computing device for generating virtual encounters in virtual games according to certain embodiments of the present disclosure.

III. One or More Computing Devices for Generating Virtual Encounters in Virtual Games According to Certain Embodiments FIG. 4 shows a simplified computing device for generating virtual encounters in virtual games according to certain embodiments of the present disclosure. This figure is merely an example, which should not unduly limit the scope of the claims. One of ordinary skill in the art would recognize many variations, alternatives, and modifications. The computing device 400 includes a processing unit 404, a memory unit 406, an input unit 408, an output unit 410, a communication unit 412, and a storage unit 414. In various embodiments, the computing device 400 is configured to be in communication with a user 416 and/or a storage device 418. In certain embodiments, the computing device 400 includes the client device 312 and/or the server 306 of FIG. 3. In some embodiments, the computing device 400 is configured to implement the method 100 of FIG. 1A and/or FIG. 1B. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the processing unit 404 is configured for executing instructions, such as instructions to implement the method 100 of FIG. 1A and/or FIG. 1B. In some embodiments, the executable instructions are stored in the memory unit 406. In certain embodiments, the processing unit 404 includes one or more processing units (e.g., in a multi-core configuration). In some embodiments, the processing unit 404 includes and/or is communicatively coupled to one or more modules for implementing the methods and systems described in the present disclosure. In certain embodiments, the processing unit 404 is configured to execute instructions within one or more operating systems. In some embodiments, upon initiation of a computer-implemented method, one or more instructions is executed during initialization. In certain embodiments, one or more operations is executed to perform one or more processes described herein. In some embodiments, an operation may be general or specific to a particular programming language (e.g., C, C++, Java, or other suitable programming languages, etc.).

In various embodiments, the memory unit 406 includes a device allowing information, such as executable instructions and/or other data to be stored and retrieved. In some embodiments, the memory unit 406 includes one or more computer readable media. In certain embodiments, the memory unit 406 includes computer readable instructions for providing a user interface, such as to the user 416, via the output unit 410. In some embodiments, a user interface includes a web browser and/or a client application. For example, a web browser enables the user 416 to interact with media and/or other information embedded on a web page and/or a website. In certain embodiments, the memory unit 406 includes computer readable instructions for receiving and processing an input via the input unit 408. In some embodiments, the memory unit 406 includes RAM such as dynamic RAM (DRAM) or static RAM (SRAM), ROM, erasable programmable read-only memory (EPROM), electrically erasable programmable read-only memory (EEPROM), and/or non-volatile RAM (NVRAM).

In various embodiments, the input unit 408 is configured to receive input (e.g., from the user 416). In some embodiments, the input unit 408 includes a keyboard, a pointing device, a mouse, a stylus, a touch sensitive panel (e.g., a touch pad or touch screen), a gyroscope, an accelerometer, a position sensor (e.g., GPS sensor), and/or an audio input device. In certain embodiments, the input unit 408 is configured to function as both an input unit and an output unit.

In various embodiments, the output unit 410 includes a media output unit configured to present information to the user 416. In some embodiments, the output unit 410 includes any component capable of conveying information to the user 416. In certain embodiments, the output unit 410 includes an output adapter such as a video adapter and/or an audio adapter. For example, the output unit 410 is operatively coupled to the processing unit 404 and/or a visual display device to present information to the user 416 (e.g., a liquid crystal display (LCD), a light emitting diode (LED) display, an organic light emitting diode (OLED) display, a cathode ray tube (CRT) display, a projected display, etc.). As an example, the output unit 410 is operatively coupled to the processing unit 404 and/or an audio display device to present information to the user 416 (e.g., a speaker arrangement or headphones).

In various embodiments, the communication unit 412 is configured to be communicatively coupled to a remote device. In some embodiments, the communication unit 412 includes a wired network adapter, a wireless network adapter, a wireless data transceiver for use with a mobile phone network (e.g., 3G, 4G, 5G, Bluetooth, near-field communication (NFC), etc.), and/or other mobile data networks. In certain embodiments, other types of short-range or long-range networks may be used. In some embodiments, the communication unit 412 is configured to provide email integration for communicating data between a server and one or more clients.

In various embodiments, the storage unit 414 is configured to enable communication between the computing device 400 and the storage device 418. In some embodiments, the storage unit 414 is a storage interface. For example, the storage interface is any component capable of providing the processing unit 404 with access to the storage device 418. In certain embodiments, the storage unit 414 includes an advanced technology attachment (ATA) adapter, a serial ATA (SATA) adapter, a small computer system interface (SCSI) adapter, a RAID controller, a SAN adapter, a network adapter, and/or any other component capable of providing the processing unit 404 with access to the storage device 418.

In various embodiments, the storage device 418 includes any computer-operated hardware suitable for storing and/or retrieving data. In certain embodiments, the storage device 418 is integrated in the computing device 400. In some embodiments, the storage device 418 includes a database such as a local database or a cloud database. In certain embodiments, the storage device 418 includes one or more hard disk drives. In some embodiments, the storage device 418 is external and is configured to be accessed by a plurality of server systems. In certain embodiments, the storage device 418 includes multiple storage units such as hard disks or solid state disks in a redundant array of inexpensive disks configuration. In some embodiments, the storage device 418 includes a storage area network and/or a network attached storage system.

IV. Examples of Certain Embodiments of the Present Disclosure

According to certain embodiments, a method for generating one or more virtual encounters in one or more virtual games includes receiving first real-world telematics data, first real-world geolocation data, and first real-world environmental data associated with one or more prior first real-world vehicle trips made by a first real-world user. Also, the method includes determining one or more first real-world driving characteristics based at least in part upon the first real-world telematics data. Additionally, the method includes generating a first virtual map based at least in part upon the first real-world geolocation data, where the first virtual map is generated for a first virtual character associated with the first real-world user. The method then includes presenting the first virtual map and the first virtual character in a virtual game. Moreover, the method includes generating one or more first virtual encounters based at least in part upon the one or more first real-world driving characteristics and the first real-world environmental data, and applying the one or more first virtual encounters to the first virtual map for the first virtual character to experience. Further, the method includes receiving second real-world telematics data, second real-world geolocation data, and second real-world environmental data associated with one or more prior second real-world vehicle trips made by a second real-world user. Also, the method includes determining one or more second real-world driving characteristics based at least in part upon the second real-world telematics data. Additionally, the method includes generating a second virtual map based at least in part upon the second real-world geolocation data, where the second virtual map is generated for a second virtual character associated with the second real-world user. The method then includes presenting the second virtual map and the second virtual character in the virtual game. Moreover, the method includes generating one or more second virtual encounters based at least in part upon the one or more second real-world driving characteristics and the second real-world environmental data, and applying the one or more second virtual encounters to the second virtual map for the second virtual character to experience. The one or more first virtual encounters and the one or more second virtual encounters are generated to be different in response to the one or more first real-world driving characteristics, the one or more second real-world driving characteristics, the first real-world environmental data, and the second real-world environmental data. For example, the method is implemented according to at least FIG. 1A and/or FIG. 1B.

According to some embodiments, a computing device for generating one or more virtual encounters for one or more virtual games includes one or more processors and a memory that stores instructions for execution by the one or more processors. The instructions, when executed, cause the one or more processors to receive first real-world telematics data, first real-world geolocation data, and first real-world environmental data associated with one or more prior first real-world vehicle trips made by a first real-world user. Also, the instructions, when executed, cause the one or more processors to determine one or more first real-world driving characteristics based at least in part upon the first real-world telematics data. Additionally, the instructions, when executed, cause the one or more processors to generate a first virtual map based at least in part upon the first real-world geolocation data, where the first virtual map is generated for a first virtual character associated with the first real-world user. The instructions, when executed, then cause the one or more processors to present the first virtual map and the first virtual character in a virtual game. Moreover, the instructions, when executed, cause the one or more processors to generate one or more first virtual encounters based at least in part upon the one or more first real-world driving characteristics and the first real-world environmental data, and apply the one or more first virtual encounters to the first virtual map for the first virtual character to experience. Further, the instructions, when executed, cause the one or more processors to receive second real-world telematics data, second real-world geolocation data, and second real-world environmental data associated with one or more prior second real-world vehicle trips made by a second real-world user. Also, the instructions, when executed, cause the one or more processors to determine one or more second real-world driving characteristics based at least in part upon the second real-world telematics data. Additionally, the instructions, when executed, cause the one or more processors to generate a second virtual map based at least in part upon the second real-world geolocation data, where the second virtual map is generated for a second virtual character associated with the second real-world user. The instructions, when executed, then cause the one or more processors to present the second virtual map and the second virtual character in the virtual game. Moreover, the instructions, when executed, cause the one or more processors to generate one or more second virtual encounters based at least in part upon the one or more second real-world driving characteristics and the second real-world environmental data, and apply the one or more second virtual encounters to the second virtual map for the second virtual character to experience. The one or more first virtual encounters and the one or more second virtual encounters are generated to be different in response to the one or more first real-world driving characteristics, the one or more second real-world driving characteristics, the first real-world environmental data, and the second real-world environmental data. For example, the computing device is implemented according to at least FIG. 3 and/or FIG. 4.

According to certain embodiments, a non-transitory computer-readable medium stores instructions for generating one or more virtual encounters for one or more virtual games. The instructions are executed by one or more processors of a computing device. The non-transitory computer-readable medium includes instructions to receive first real-world telematics data, first real-world geolocation data, and first real-world environmental data associated with one or more prior first real-world vehicle trips made by a first real-world user. Also, the non-transitory computer-readable medium includes instructions to determine one or more first real-world driving characteristics based at least in part upon the first real-world telematics data. Additionally, the non-transitory computer-readable medium includes instructions to generate a first virtual map based at least in part upon the first real-world geolocation data, where the first virtual map is generated for a first virtual character associated with the first real-world user. The non-transitory computer-readable medium then includes instructions to present the first virtual map and the first virtual character in a virtual game. Moreover, the non-transitory computer-readable medium includes instructions to generate one or more first virtual encounters based at least in part upon the one or more first real-world driving characteristics and the first real-world environmental data, and apply the one or more first virtual encounters to the first virtual map for the first virtual character to experience. Further, the non-transitory computer-readable medium includes instructions to receive second real-world telematics data, second real-world geolocation data, and second real-world environmental data associated with one or more prior second real-world vehicle trips made by a second real-world user. Also, the non-transitory computer-readable medium includes instructions to determine one or more second real-world driving characteristics based at least in part upon the second real-world telematics data. Additionally, the non-transitory computer-readable medium includes instructions to generate a second virtual map based at least in part upon the second real-world geolocation data, where the second virtual map is generated for a second virtual character associated with the second real-world user. The non-transitory computer-readable medium then includes instructions to present the second virtual map and the second virtual character in the virtual game. Moreover, the non-transitory computer-readable medium includes instructions to generate one or more second virtual encounters based at least in part upon the one or more second real-world driving characteristics and the second real-world environmental data, and apply the one or more second virtual encounters to the second virtual map for the second virtual character to experience. The one or more first virtual encounters and the one or more second virtual encounters are generated to be different in response to the one or more first real-world driving characteristics, the one or more second real-world driving characteristics, the first real-world environmental data, and the second real-world environmental data. For example, the non-transitory computer-readable medium is implemented according to at least FIG. 1A, FIG. 1B, FIG. 3, and/or FIG. 4.

V. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

VI. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A method for generating one or more virtual encounters in one or more virtual games, the method comprising:
   receiving, by a computing device, first real-world telematics data, first real-world geolocation data, and first real-world environmental data associated with one or more prior first real-world vehicle trips made by a first real-world user;
   determining, by the computing device, one or more first real-world driving characteristics based at least in part upon the first real-world telematics data;
   generating, by the computing device, a first virtual map based at least in part upon the first real-world geolocation data, the first virtual map being generated for a first virtual character associated with the first real-world user;
   presenting, by the computing device, the first virtual map and the first virtual character in a virtual game;
   generating, by the computing device, one or more first virtual encounters based at least in part upon the one or more first real-world driving characteristics and the first real-world environmental data;
   applying, by the computing device, the one or more first virtual encounters to the first virtual map for the first virtual character to experience;
   receiving, by the computing device, second real-world telematics data, second real-world geolocation data, and second real-world environmental data associated with one or more prior second real-world vehicle trips made by a second real-world user;
   determining, by the computing device, one or more second real-world driving characteristics based at least in part upon the second real-world telematics data;
   generating, by the computing device, a second virtual map based at least in part upon the second real-world geolocation data, the second virtual map being generated for a second virtual character associated with the second real-world user;
   presenting, by the computing device, the second virtual map and the second virtual character in the virtual game;
   generating, by the computing device, one or more second virtual encounters based at least in part upon the one or more second real-world driving characteristics and the second real-world environmental data; and
   applying, by the computing device, the one or more second virtual encounters to the second virtual map for the second virtual character to experience;
   wherein, the one or more first virtual encounters and the one or more second virtual encounters are generated to be different in response to the one or more first real-world driving characteristics, the one or more second real-world driving characteristics, the first real-world environmental data, and the second real-world environmental data.

2. The method of claim 1, wherein,
   the one or more first real-world driving characteristics and the one or more second real-world driving characteristics are different;
   the first real-world environmental data and the second real-world environmental data are the same; and
   the one or more first virtual encounters and the one or more second virtual encounters are generated to be different in response to the one or more first real-world driving characteristics and the one or more second real-world driving characteristics being different and the first real-world environmental data and the second real-world environmental data being the same.

3. The method of claim 1, wherein,
the one or more first real-world driving characteristics and the one or more second real-world driving characteristics are the same;
the first real-world environmental data and the second real-world environmental data are different; and
the one or more first virtual encounters and the one or more second virtual encounters are generated to be different in response to the one or more first real-world driving characteristics and the one or more second real-world driving characteristics being the same and the first real-world environmental data and the second real-world environmental data being different.

4. The method of claim 1, wherein,
the one or more first real-world driving characteristics and the one or more second real-world driving characteristics are different;
the first real-world environmental data and the second real-world environmental data are different; and
one or more first virtual encounters and the one or more second virtual encounters are generated to be different in response to the one or more first real-world driving characteristics and the one or more second real-world driving characteristics being different and the first real-world environmental data and the second real-world environmental data being different.

5. The method of claim 1, wherein,
the first real-world geolocation data and the second real-world geolocation data are different; and
the first virtual map and the second virtual map are generated to be different in response to the first real-world geolocation data and the second real-world geolocation data being different.

6. The method of claim 1, wherein, the generating, by the computing device, the one or more first virtual encounters based at least in part upon the one or more first real-world driving characteristics and the first real-world environmental data includes:
generating one or more first virtual experiences for the first virtual character to experience in the first virtual map based at least in part upon the one or more first real-world driving characteristics; and
generating one or more first virtual environmental conditions for the first virtual character to experience in the first virtual map based at least in part upon the one or more first real-world environmental data.

7. The method of claim 6, wherein, the generating the one or more first virtual experiences for the first virtual character to experience in the first virtual map based at least in part upon the one or more first real-world driving characteristics includes generating one or more first virtual obstacles to be placed at corresponding one or more first virtual locations.

8. The method of claim 6, wherein, the generating the one or more first virtual environmental conditions for the first virtual character to experience in the first virtual map based at least in part upon the one or more first real-world environmental data includes generating at least one selected from a group consisting of a first virtual weather condition, a first virtual traffic condition, and a first virtual road condition.

9. The method of claim 6, wherein, the generating, by the computing device, the one or more second virtual encounters based at least in part upon the one or more second real-world driving characteristics and the second real-world environmental data includes:
generating one or more second virtual experiences for the second virtual character to experience in the second virtual map based at least in part upon the one or more second real-world driving characteristics; and
generating one or more second virtual environmental conditions for the second virtual character to experience in the second virtual map based at least in part upon the one or more second real-world environmental data.

10. The method of claim 9, wherein, the generating the one or more second virtual experiences for the second virtual character to experience in the second virtual map based at least in part upon the one or more second real-world driving characteristics includes generating one or more second virtual obstacles to be placed at corresponding one or more second virtual locations.

11. The method of claim 9, wherein, the generating the one or more second virtual environmental conditions for the second virtual character to experience in the second virtual map based at least in part upon the one or more second real-world environmental data includes generating at least one selected from a group consisting of a second virtual weather condition, a second virtual traffic condition, and a second virtual road condition.

12. A computing device for generating one or more virtual encounters in one or more virtual games, the computing device comprising:
one or more processors; and
a memory storing instructions that, when executed by the one or more processors, cause the one or more processors to:
receive first real-world telematics data, first real-world geolocation data, and first real-world environmental data associated with one or more prior first real-world vehicle trips made by a first real-world user;
determine one or more first real-world driving characteristics based at least in part upon the first real-world telematics data;
generate a first virtual map based at least in part upon the first real-world geolocation data, the first virtual map being generated for a first virtual character associated with the first real-world user;
present the first virtual map and the first virtual character in a virtual game;
generate one or more first virtual encounters based at least in part upon the one or more first real-world driving characteristics and the first real-world environmental data;
apply the one or more first virtual encounters to the first virtual map for the first virtual character to experience;
receive second real-world telematics data, second real-world geolocation data, and second real-world environmental data associated with one or more prior second real-world vehicle trips made by a second real-world user;
determine one or more second real-world driving characteristics based at least in part upon the second real-world telematics data;
generate a second virtual map based at least in part upon the second real-world geolocation data, the second virtual map being generated for a second virtual character associated with the second real-world user;

present the second virtual map and the second virtual character in the virtual game;
generate one or more second virtual encounters based at least in part upon the one or more second real-world driving characteristics and the second real-world environmental data; and
apply the one or more second virtual encounters to the second virtual map for the second virtual character to experience;
wherein, the one or more first virtual encounters and the one or more second virtual encounters are generated to be different in response to the one or more first real-world driving characteristics, the one or more second real-world driving characteristics, the first real-world environmental data, and the second real-world environmental data.

13. The computing device of claim 12, wherein,
the one or more first real-world driving characteristics and the one or more second real-world driving characteristics are different;
the first real-world environmental data and the second real-world environmental data are the same; and
the one or more first virtual encounters and the one or more second virtual encounters are generated to be different in response to the one or more first real-world driving characteristics and the one or more second real-world driving characteristics being different and the first real-world environmental data and the second real-world environmental data being the same.

14. The computing device of claim 12, wherein,
the one or more first real-world driving characteristics and the one or more second real-world driving characteristics are the same;
the first real-world environmental data and the second real-world environmental data are different; and
the one or more first virtual encounters and the one or more second virtual encounters are generated to be different in response to the one or more first real-world driving characteristics and the one or more second real-world driving characteristics being the same and the first real-world environmental data and the second real-world environmental data being different.

15. The computing device of claim 12, wherein,
the one or more first real-world driving characteristics and the one or more second real-world driving characteristics are different;
the first real-world environmental data and the second real-world environmental data are different; and
one or more first virtual encounters and the one or more second virtual encounters are generated to be different in response to the one or more first real-world driving characteristics and the one or more second real-world driving characteristics being different and the first real-world environmental data and the second real-world environmental data being different.

16. The computing device of claim 12, wherein,
the first real-world geolocation data and the second real-world geolocation data are different; and
the first virtual map and the second virtual map are generated to be different in response to the first real-world geolocation data and the second real-world geolocation data being different.

17. A non-transitory computer-readable medium storing instructions for generating one or more virtual encounters in one or more virtual games, the instructions when executed by one or more processors of a computing device, cause the computing device to:
receive first real-world telematics data, first real-world geolocation data, and first real-world environmental data associated with one or more prior first real-world vehicle trips made by a first real-world user;
determine one or more first real-world driving characteristics based at least in part upon the first real-world telematics data;
generate a first virtual map based at least in part upon the first real-world geolocation data, the first virtual map being generated for a first virtual character associated with the first real-world user;
present the first virtual map and the first virtual character in a virtual game;
generate one or more first virtual encounters based at least in part upon the one or more first real-world driving characteristics and the first real-world environmental data;
apply the one or more first virtual encounters to the first virtual map for the first virtual character to experience;
receive second real-world telematics data, second real-world geolocation data, and second real-world environmental data associated with one or more prior second real-world vehicle trips made by a second real-world user;
determine one or more second real-world driving characteristics based at least in part upon the second real-world telematics data;
generate a second virtual map based at least in part upon the second real-world geolocation data, the second virtual map being generated for a second virtual character associated with the second real-world user;
present the second virtual map and the second virtual character in the virtual game;
generate one or more second virtual encounters based at least in part upon the one or more second real-world driving characteristics and the second real-world environmental data; and
apply the one or more second virtual encounters to the second virtual map for the second virtual character to experience;
wherein, the one or more first virtual encounters and the one or more second virtual encounters are generated to be different in response to the one or more first real-world driving characteristics, the one or more second real-world driving characteristics, the first real-world environmental data, and the second real-world environmental data.

18. The non-transitory computer-readable medium of claim 17, wherein,
the one or more first real-world driving characteristics and the one or more second real-world driving characteristics are different;
the first real-world environmental data and the second real-world environmental data are the same; and
the one or more first virtual encounters and the one or more second virtual encounters are generated to be different in response to the one or more first real-world driving characteristics and the one or more second real-world driving characteristics being different and the first real-world environmental data and the second real-world environmental data being the same.

19. The non-transitory computer-readable medium of claim 17, wherein:
the one or more first real-world driving characteristics and the one or more second real-world driving characteristics are the same;

the first real-world environmental data and the second real-world environmental data are different; and the one or more first virtual encounters and the one or more second virtual encounters are generated to be different in response to the one or more first real-world driving characteristics and the one or more second real-world driving characteristics being the same and the first real-world environmental data and the second real-world environmental data being different.

20. The non-transitory computer-readable medium of claim 17, wherein, the one or more first real-world driving characteristics and the one or more second real-world driving characteristics are different;

the first real-world environmental data and the second real-world environmental data are different; and the one Or more first virtual encounters and the one or more second virtual encounters are generated to be different in response to the one or more first real-world driving characteristics and the one or more second real-world driving characteristics being different and the first real-world environmental data and the second real-world environmental data being different.

21. The non-transitory computer-readable medium of claim 17, wherein, the first real-world geolocation data and the second real-world geolocation data are different; and the first virtual map and the second virtual map are generated to be different in response to the first real-world geolocation data and the second real-world geolocation data being different.

\* \* \* \* \*